US005672413A

United States Patent [19]

Taylor et al.

[11] Patent Number: 5,672,413

[45] Date of Patent: Sep. 30, 1997

[54] ELEMENT AND ASSOCIATED PROCESS FOR USE WITH INKJET HOT MELT INKS FOR THERMAL IMAGE TRANSFER

[75] Inventors: Dene Harvey Taylor, Holyoke; Douglas Allan Cahill, Belchertown, both of Mass.

[73] Assignee: Rexam Graphics Incorporated, South Hadley, Mass.

[21] Appl. No.: 534,638

[22] Filed: Sep. 27, 1995

[51] Int. Cl.[6] .......... B32B 3/00

[52] U.S. Cl. .......... 428/195; 428/346; 428/355; 428/402; 428/411.1; 428/423.1; 428/488.4; 428/500; 428/914

[58] Field of Search .......... 428/195, 411.1, 428/488.4, 423.1, 346, 913, 914, 355, 402, 500

[56] References Cited

U.S. PATENT DOCUMENTS

| | | | |
|---|---|---|---|
| 3,043,732 | 7/1962 | Shepherd | 156/230 |
| 3,519,456 | 7/1970 | Reed et al. | 117/3.1 |
| 3,607,526 | 9/1971 | Blegen | 156/235 |
| 4,027,345 | 6/1977 | Fujisawa et al. | 8/2.5 |
| 4,171,398 | 10/1979 | Hunt | 428/195 |
| 4,235,657 | 11/1980 | Greenman et al. | 156/234 |
| 4,318,953 | 3/1982 | Smith et al. | 428/200 |
| 4,721,635 | 1/1988 | Helinski | 428/15 |

FOREIGN PATENT DOCUMENTS 42-76393B 10/1979 Japan .

OTHER PUBLICATIONS

IS & T Reporter, vol. 7, No. 1, Mar. 1992, pp. 1 & 3–4 Authors—William G. Hawkins & Ivan Rezanka—Xerox Corp.

*Primary Examiner*—William Krynski
*Attorney, Agent, or Firm*—Ratner & Prestia

[57] ABSTRACT

An element for using hot melt inks in an image transfer system is disclosed. The element has a particular structure which can be imaged with inkjet apparatus and hot melt ink, and the image may be transferred onto a substrate which is difficult to image directly, using heat and pressure. The resulting imaged article and process of obtaining it is also disclosed. The element contains, in order, a temporary carrier sheet, a protective layer and an image receptive adhesive layer, both layers having well defined composition and properties.

8 Claims, 1 Drawing Sheet

ELEMENT AND ASSOCIATED PROCESS FOR USE WITH INKJET HOT MELT INKS FOR THERMAL IMAGE TRANSFER

FIELD OF THE INVENTION

This invention relates to thermal image transfer, and more particularly to an element, and related process, for accepting a hot-melt ink image from an ink-jet imaging device and for transferring under heat and pressure the image onto a permanent substrate.

BACKGROUND OF THE INVENTION

Placing an image on a substrate is an old process which can be divided into two broad categories. Direct imaging where the image is printed directly on the final substrate and transfer imaging, where the image is first printed onto an intermediate substrate and then transferred onto the final substrate. This latter method is particularly useful where the nature of the final substrate makes it difficult to print directly thereon, for a variety of reasons, including possible ink related problems such as ink absorption or adhesion, or problems relating to the physical structure of the substrate such as stiffness, bulk, size, flimsiness and the like.

A commonly used process for imaging a difficult to image directly substrate is to image a temporary carrier first and then laminate the imaged temporary carrier onto the difficult to image substrate. Lamination is typically done under heat and pressure and following lamination the temporary carrier may remain as a protective layer over the image or may be removed.

In the last decade or so, inkjet imaging was developed to the point where it is in widespread commercial use. Inkjet technology offers silent, high speed, and high quality printing in both in color and monochrome imaging. One of the most recent developments in inkjet technology is the use of a material known as "hot melt" or "phase change" ink. Both terms are used to describe a material that is solid at ambient temperatures but molten at a temperature maintained in an inkjet head, such that it can be ejected as droplets that will re-solidify on contact with a substrate. No volatile solvents are required as in many industrial inkjet systems, nor are aqueous solutions as the majority of inkjet printers for the office.

Hot melt inks are advantageous in that they tend to eliminate the problem of edge acuity and color strength which is related to the use of water in aqueous inks. The molten hot melt droplet solidifies rapidly on contact with the substrate and maintains its shape conferring major advantages in substrate selection and good color strength.

The widespread use of inkjet equipment in industry and the advantages such equipment present in terms of ease of use and accessibility, would present great commercial opportunity if they could be used not only for direct printing applications but also for indirect imaging whereby an image would be printed on a temporary carrier and then transferred under heat and pressure onto a permanent substrate, i.e. vinyl, to produce an article such as a Banner or advertising panel. Such an article would require that it be able to withstand some rough handling, at least for a limited period of time, and should remain flexible and resist cracking and creasing.

Hot melt inks would appear to present a great opportunity to satisfy this need, however hot melt inks by their nature which allows them to be used in inkjet printing, exist in two phases, liquid and solid in a temperature range where most lamination and image transfers normally occur, i.e. about 185° F. and above.

In addition, transferred images if they are to survive the typical rigors of banners or advertizing panels and the like which means exposure to the elements for any length of time, must be protected by some form of protective cover. Such cover layer must provide good protection to physical and chemical damage, and also be flexible and transparent. Such layer must also remain firmly adhered to the substrate, and the imaged areas, and be able to transfer with the image from the temporary carrier to the substrate.

Finally, whatever structure is used for the temporary imaged element it must be such that the hot melt ink from the ink jet will deposit thereon and produce a high quality image which will not degrade at least to any substantial degree upon transfer. Therefore, it is desirable to be able to effectuate such transfer at a temperature bellow that where the hot melt ink will undergo phase change.

SUMMARY OF THE INVENTION

It is an object of the present invention to provide an element which serves to accept a hot melt ink image from an inkjet printer and to transfer said image together with a protective layer onto a difficult to image substrate.

An other object of this invention is to provide an element for use with hot melt ink jet imaging apparatus comprising:

A dimensionaly stable temporary substrate;

A transparent protective layer applied on said substrate;

A transparent hot melt ink jet receptive, temperature activated, adhesive layer, at least 1 micron thick, having an activation temperature of between about 150° F. (65° C.) and about 185° F. (85° C.) applied over said protective layer, the transparent protective layer exhibiting a higher degree of adhesion to the ink receptive adhesive layer than the temporary substrate.

Still according to this invention the element's adhesive layer comprises a polyurethane, an acrylic resin having a glass transition temperature (Tg) of less than about 125° F. (52° C.), and a plasticizer.

It is a further object of this invention to provide an imaged article comprising in the order given:

a support sheet;

a hot melt ink-jet image layer;

a transparent, hot melt ink-jet receptive, temperature activated, adhesive layer, at least 1 micron thick, having an activation temperature of between about 150° F. (65° C.) and about 185° F. (85° C.); and a transparent protective layer;

and wherein the adhesive layer comprises a polyurethane, an acrylic resin, and a plasticizer and the support sheet is a vinyl.

BRIEF DESCRIPTION OF THE DRAWINGS

The invention will next be described with reference to the drawings in which.

DETAILED DESCRIPTION OF THE INVENTION

During the following detailed description of this invention reference will be made to the figures in which similar numbers refer to similar elements.

Figure 1:
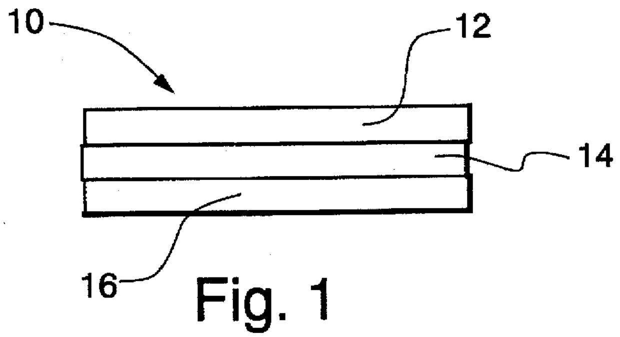
FIG. 1 represents an element in accordance with the present invention.

Referring now to FIG. 1 there is shown an element 10 in accordance with this invention. The element comprises a temporary carrier 12, a protective layer 14 on said carrier 12, and an adhesive layer 16 over said protective layer 16.

The temporary carrier 12 functions as a temporary support to the superposed layers during the process of imaging and the subsequent step of lamination and image transfer using pressure and heat.

The adherence of the temporary carrier sheet 12 to the protective layer must be less than the adherence of the protective layer 14 to the adhesive layer 16, and of the adhesive layer 16 to a substrate 20 and to a hot melt image ink layer 18, so that the carrier sheet can be peeled off of the protective layer following lamination of the adhesive layer to the substrate without disturbing the transferred image. To enhance release characteristics, the carrier sheet may be treated or coated with a material which improves release characteristics, such as a silicone release agent. Paper, for example, if used as a temporary carrier, must be surface treated to have the proper release characteristics. Surface treatment is not required for most polymer films.

A preferred material for the temporary carrier sheet 12, is untreated poly(ethylene terephthalate) film (PET). While film thickness is not critical, the film should be of sufficient thickness to provide dimensional stability to the transfer element during the coating imaging and transfer processes and to be removable without tearing following lamination of the transfer element to the substrate. Films of about 50–250 microns thick, preferably 75 to 150 microns thick, may be used.

PET film, with a glossy surface, is preferred as a temporary carrier, particularly for applications where a glossy finish on the protective layer surface after lamination is desirable, since the protective layer surface tends to have the same qualities in terms of gloss as the surface of the carrier on which it is coated.

The protective layer 14, must not only exhibit good release properties from the carrier sheet, but also good resistance to scratching, cleaning, rain, wind blown particle impact, and in general, exposure to the elements. It must be highly transparent to at least a selected portion of the visible spectrum, and may include additives in the form of an ultraviolet radiation absorber. It must not be subject to creasing and must exhibit a high degree of flexibility. A preferred protective layer is a urethane polymer, particularly an aliphatic aqueous colloidal dispersion of a urethane polymer such as NeoRez® R-9679 produced by ZENECA Resins.

The adhesive layer 16 must exhibit a number of fairly well defined properties. It must exhibit greater adhesion to the protective layer than the protective layer exhibits to the carrier sheet. It must be non-tacky at room temperature up to temperatures typically encountered during transport which may range to 150° F. (65° C.). It must be transparent to at least the same selected portion of the visible spectrum as the protective layer. It must exhibit at least the same flexibility and crease resistance as the protective layer. It must be able to accept and adhere to hot melt inks deposited on its surface by an inkjet device before and after lamination. It must be activated to exhibit its adhesive properties at an activation temperature which is above 150° F. (65° C.) but below the temperature at which the hot melt inks switch phase from solid to liquid, e.g. about 185° F. (85° C.).

Suitable combination of materials for use as adhesives exhibiting the above properties have been found to be a composition comprising a thermoplastic polyurethane, an acrylic resin, preferably one with a glass transition temperature (Tg) of under 122° F. (52° C.), and a plasticizer, preferably a phthalate such as diButyl phthalate, in the following proportions by dry coating weight:

a) thermoplastic polyurethane . . . from about 20% to 30%
b) dibutyl phthalate . . . from about 36% to 55%
c) acrylic resin . . . from about 30% to 45%
d) Spacer particles (i.e. silica 2–4 μm) from 0% to about 10%.

An adhesive layer comprising the above given composition should preferably have a thickness of no less than 4 microns. However other adhesive compositions may be used and the required adhesive layer thickness may be as low as 1 micron.

Figure 2:
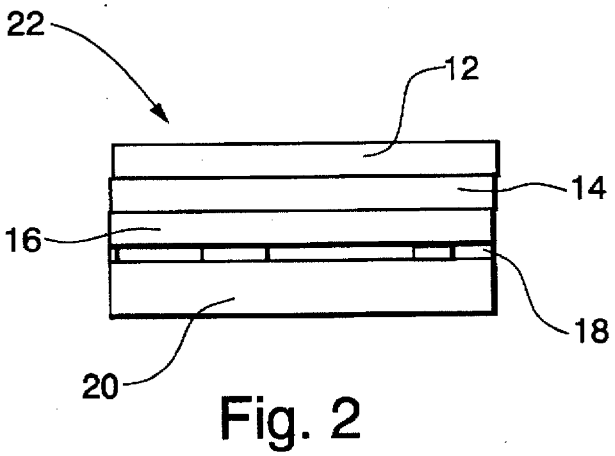
FIG. 2 represents an imaged substrate imaged in accordance with this invention.

FIG. 2 shows the resulting imaged article 22 that is produced after lamination and removal of the temporary carrier 12. A permanent substrate 20 supports an image layer 18 comprising at least one color hot melt ink, and preferably a plurality of colored hot melt inks forming a colored image.

The substrate is a difficult to coat material, typically a deformable or porous web or sheet material. Deformable substrates are frequently used to produce images that will conform to irregularly shaped objects, such as windshields, the sides of a trucks or other vehicles, brick walls, etc. Porous substrates are typically used to prepare signs, banners, packaging, etc.

Poly(vinyl chloride) film about 50–150 micron thick, commonly known as cling vinyl or static cling vinyl, is a deformable substrate. After transfer of a receptor layer, this material can be imaged to produce images for stickers for automobile windows, decals, backlit applications, etc.

Another deformable substrate is poly(vinyl chloride) film bearing on one side a layer of pressure sensitive adhesive covered with a release liner. This material can be used to prepare bumper stickers and other adherent signs, such as for fleet graphics. Extremely thin or tissue-like substrates are also deformable substrates.

Sign and banner material is not only deformable but is also porous. Porous substrates are difficult to coat because the material absorbs the coating solution. Typical sign and banner materials include: acrylic primed spun bonded poly (propylene); acrylic primed spun bonded poly(ethylene); extrusion coated high density poly(ethylene) weave; vinyl reinforced polyester; top coated vinyl reinforced polyester; two sided vinyl reinforced polyester; vinyl reinforced glass cloth; poly(ethylene); cotton drill; acrylic coated cotton; and equivalent materials known in the art. Other porous substrates include corrugated materials, such as cardboard; chipboard; and other porous packaging materials.

Hot melt inks tend to be designed to very strict specifications for use with a particular printer, especially when the objective is a colored image. Hot melt inks are available with melting temperatures as low as 160° F. (71° C.) but more commonly have a melting point between 187° F. (86° C.) and 205° F. (96° C.). In the examples that follow, the inks used were phase change designed for use with an inkjet printer manufactured by Tektronics Corporation and sold under the designation TEKTRONICS PHASER III. They are essentially an ink comprising a wax and a die whose melt and flow characteristics are tailored for use with the Tektronics printer mentioned above. They are available through Tektronics Inc. under the name Phaser III inks.

The image layer produced, may be continuous but most likely has areas of ink and areas without any ink, and includes areas of overlapping ink globules.

Overlaying the image layer 18 is the adhesive layer 16. The adhesive layer extends both over the ink and where the image layer has no ink the adhesive layer 16 is in contact with the permanent substrate 20.

The protective layer 14 adheres to the adhesive layer and is the uppermost layer following lamination and removal of the carrier sheet 12. Thus the adhesive layer serves to adhere the image to the receptor and the protective layer to the image, and itself provides additional protection to the image in the final imaged article.

Figure 3:
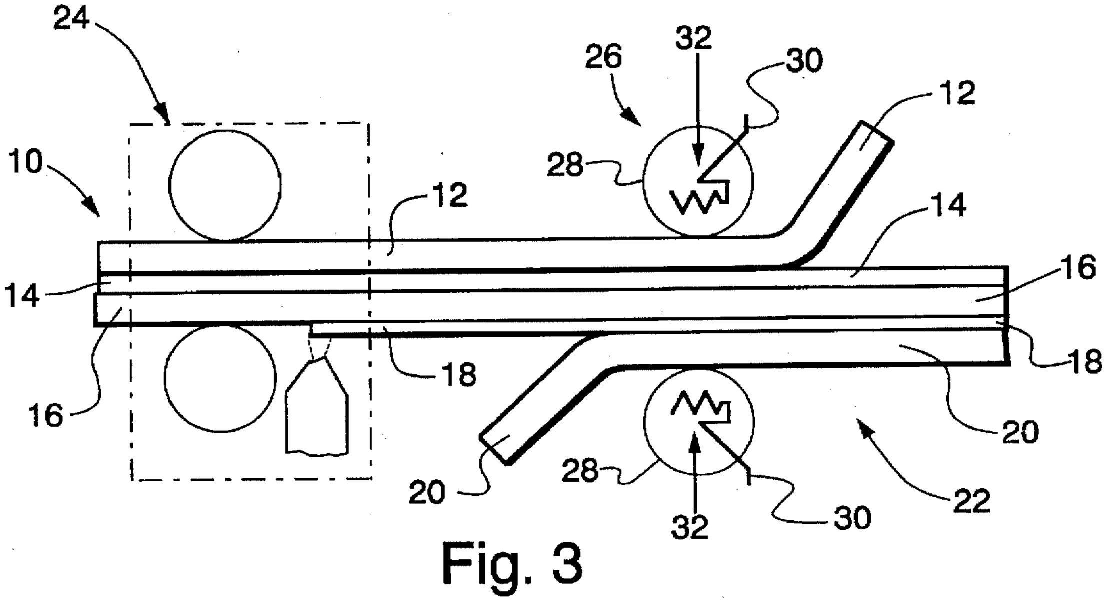
FIG. 3 is a schematic representation of the process for imaging a substrate in accordance with this invention.

The element is used typically as illustrated in FIG. 3. The element 10 is first imaged by passing the element through an inkjet imaging station 24. This station may be a single color station depositing ink of a single color or it may be a plurality of stations capable of depositing a plurality of different color inks to provide a colored image. The imaged element is next passed through a lamination station 26 comprising a pair of laminating rollers 28 which are heated to a temperature of about 185° F. through heaters 30. Pressure of about 100 psi (pounds per square inch) is applied to the rollers in the direction of arrows 32. The element 22 is passed through the laminator in contact with the substrate 20, the substrate being in contact with the image layer 18. Following lamination the carrier 12 is peeled off the laminated structure leaving an imaged article comprising the substrate, the hot melt ink layer, the adhesive layer and the protective layer, in the order given.

A major difficulty in developing an element which will satisfy the above mentioned requirements for use in the above described process is formulating the adhesive layer, particularly obtaining the proper adhesion of the adhesive layer 16 to the imaged layer 18, and specifically to the hot melt ink areas. As shown by the following comparative examples, both the nature of the protective layer and the components in the adhesive layer are significant in obtaining the wanted properties:

COMPARATIVE EXAMPLES

The following elements were produced as follows:

A sheet of polyethylene terephthalate 3 mils (76 microns) thick was coated with a protective layer having the following composition:

60% by weight toluene

20% By weight methyl ethyl ketone (MEK)

20% by weight Lustran® SAN[1]

[1] Lustran® SAN is a product of the Monsanto Co. and is styrene acrylonitrile.

The coating was done using a #42 Meyer rod and the dry coating thickness was 0.035 mils (9 microns).

After the coating dried, an adhesive layer was coated thereover using a #28 Meyer rod to a dry thickness of 0.015 mils (4 microns) from a solution containing the following by weight percent:

| | |
|---|---|
| 6% | Elvacite ® 2014[2] |
| 3% | Morthane ® CA-100[3] |
| 50% | toluene |
| 20% | MEK |
| 21% | Dowanol ® PM[4] |

[2] Elvacite ® 2014 is a product of ICI Acrylics Inc. and is poly(methyl methacrylate/2-ethylhexyl methacrylate/methacrylic acid) having a Tg of about 104° F. (40° C.).
[3] Morthane ® CA-100 thermoplastic polyurethane resin is a product of Morton International, and is a hydroxyl terminated polyurethane elastomer.
[4] Dowanol ® PM is propylene glycol monomethyl ether and is a product of Dow Chemical Corp.

The dried element was imaged using hot melt inks in an inkjet printer and was laminated onto a vinyl sheet substrate at a temperature of about 185° F. (85° C.) and 100 psi at a rate of 1 foot/minute. The carrier PET sheet was removed. The adhesion between the ink layer and the adhesive layer was judged poor. The transferred layers were brittle and did not withstand creasing.

A second, third, and fourth elements were produced using the same protective layer, but adding the 5% by weight of the following plasticizer to the adhesive layer coating composition:

a) Element 2 . . . Piccolastic® A-5[5]

b) Element 3 . . . diButyl phthalate c) Element 4 . . . dicyclohexyl phthalate

[5] Piccolastic® A-5 is a product of Hercules Inc., and is a low molecular weight polystyrene.

Again the elements were imaged and laminated onto a vinyl substrate. While some improvement was observed with respect to the creasing and cracking sensitivity adhesion of the inked areas to the adhesive did not show improvement.

EXAMPLE 1

The following element was prepared:

A Protective layer consisting of a 50% by weight dispersion of NeoRez® R-9679 (an aliphatic aqueous colloidal dispersion of a urethane polymer produced by ZENECA Resins) in water, was coated on the same type 3 mil (76 micron) thick PET film temporary carrier using a #38 Meyer rod. The resulting element was dried at about 250° F. (121° C.) for 2 min. The dried layer was about 7 micron thick. After drying an adhesive layer was applied over the protective layer with a #28 Meyer rod to a dry thickness of about 5 microns.

The adhesive layer was applied from coating solution containing the following ingredients prepared by mixing the Elvacite®, MEK, and toluene, in a high speed Lightning mixer for 30 minutes, the Morthane® CA-100, toluene and MEK also in a high speed Lightning mixer for 30 minutes and then the two solutions together with the dibutyl phthalate, the Dowanol® PM and the remaining MEK, together in a high speed Lightning mixer for 10 minutes. Silica spacer particles were added and mixing continued for 5 min.

Ingredients for Adhesive Coating Solution

| | |
|---|---|
| 15 parts by weight | Dowanol ® PM |
| 15 parts by weight | MEK |
| 35 parts by weight | 12% Solution of Morthane ® CA-100. (67% by weight Toluene, 21% By weight MEK, 12% by weight Morthane ® CA-100.) |
| 35 parts by weight | 20% Solution of Elvacite ® 2014 (60% by weight Toluene, 20% by weight MEK, 20% by weight Elvacite ® 2014.) |
| 7.5 parts by weight | dibutyl phthalate |
| 0.4 parts by weight | Hisil ® T600S (silica particles having an average diameter of between 2 and 4 microns.) |

The element was imaged and laminated as before onto a 5.5 mil (about 140 micron) thick static cling vinyl (Flexmark® CV600W, by Flexcon Co. of Spencer Mass.); onto untreated cast vinyl with a pressure sensitive adhesive covered with a release liner on the opposite side (Rexcal® 4000 adhesive backed vinyl by Rexam Branded Products, Lancaster, S.C.); and onto laminated vinyl banner material (Saturn® by ICG of Chicago Ill.), comprising a black core with vinyl sheeting laminated on both sides so that indicia may applied to both sides of the banner. It was observed that the temporary carrier released much easier following lamination, that the adhesion of the inked areas to the adhesive layer was improved to acceptable levels, and that the scratch resistance, the creasing resistance and the cracking resistance were all acceptable.

Those skilled in the art having the benefit of the teachings of the present invention as hereinabove set forth, can effect numerous modifications thereto. These modifications are to be construed as being encompassed within the scope of the present invention as set forth hereinabove.

Having described the invention, we now claim the following and their equivalents:

1. An element for use with a hot melt ink jet imaging apparatus comprising:

a dimensionaly stable temporary carrier;

a flexible, transparent protective layer over said temporary carrier; and a hot melt ink jet receptive, temperature activated, adhesive layer over said protective layer; wherein said adhesive layer:

is at least 1 micron thick;

exhibits greater adhesion to said protective layer than said protective layer exhibits to said temporary carrier;

is non-tacky at room temperature up to a temperature of 150° F.;

has an activation temperature of between about 150° F. and about 185° F.;

is transparent; and has at least the same flexibility and crease resistance as said protective layer.

2. The element according to claim 1 wherein the adhesive layer has a thickness of at least 4 microns and comprises a thermoplastic polyurethane soluble in an organic solvent, an acrylic resin having a glass transition temperature (Tg) of less than about 122° F., and a plasticizer.

3. The element according to claim 2 wherein the adhesive layer comprises between about 20% by weight and about 30% by weight polyurethane, between about 30% and about 45% by weight acrylic resin, between about 36% and 55% by weight dibutyl phthalate.

4. The element according to claim 2 wherein the adhesive layer also comprises spacer particles evenly distributed throughout the layer.

5. The element according to claim 4 wherein the spacer particles are silica particles.

6. The element according to claim 2 wherein the adhesive layer is applied over the protective layer from a coating solution comprising methyl ethyl ketone.

7. The element according to claim 3 wherein the adhesive layer is applied over the protective layer from a coating solution comprising methyl ethyl ketone and toluene.

8. The element according to claim 2 wherein the protective layer comprises an aliphatic, aqueous-dispersible urethane polymer.

* * * * *